Sept. 24, 1957 G. V. KULLGREN ET AL 2,807,097
APPARATUS FOR HEATING AND STRETCHING FABRICS
Filed Sept. 28, 1955 8 Sheets-Sheet 1

Fig. 1

INVENTORS.
GILBERT V. KULLGREN AND
BY DWIGHT M. WILKINSON
Bosworth, Sessions,
Herrstrom, & Lawler
ATTORNEYS

FIG. 2

Sept. 24, 1957  G. V. KULLGREN ET AL  2,807,097
APPARATUS FOR HEATING AND STRETCHING FABRICS
Filed Sept. 28, 1955  8 Sheets-Sheet 3

FIG. 3

INVENTORS.
GILBERT V. KULLGREN AND
BY DWIGHT M. WILKINSON
ATTORNEYS

Fig. 4

Sept. 24, 1957    G. V. KULLGREN ET AL    2,807,097
APPARATUS FOR HEATING AND STRETCHING FABRICS
Filed Sept. 28, 1955    8 Sheets-Sheet 5

INVENTORS.
GILBERT V. KULLGREN AND
BY DWIGHT M. WILKINSON
ATTORNEYS

Sept. 24, 1957  G. V. KULLGREN ET AL  2,807,097
APPARATUS FOR HEATING AND STRETCHING FABRICS
Filed Sept. 28, 1955  8 Sheets-Sheet 6

INVENTORS
GILBERT V. KULLGREN and
BY DWIGHT M. WILKINSON
ATTORNEYS

United States Patent Office 2,807,097
Patented Sept. 24, 1957

2,807,097

APPARATUS FOR HEATING AND STRETCHING FABRICS

Gilbert V. Kullgren, Akron, and Dwight M. Wilkinson, Cleveland, Ohio, assignors to The Aetna-Standard Engineering Company, Pittsburgh, Pa., a corporation of Ohio Application September 28, 1955, Serial No. 537,266

23 Claims. (Cl. 34—48)

This invention relates to apparatus for hot-stretching textile fabrics, particularly fabrics made of synthetic thread such as nylon, polyester resin ("Dacron"), etc. This application is a continuation in part of co-pending application Serial No. 449,946, filed August 16, 1954.

In readying synthetic resin fabrics for industrial uses, as, for example, in the manufacture of automobile tires and other kinds of mechanical rubber goods, it is often desirable to subject the fabric to drastic stretching, meanwhile heating and cooling it in rapid succession. However, because certain synthetic resin fabrics; e. g., fabrics made of nylon, tend to melt or at least to undergo extensive degradation at temperatures above 250° F., it is necessary that the heating and cooling steps be carefully controlled. The heating time in particular should not be permitted to last for more than a few seconds. Therefore, means must be provided to heat and cool the fabric to the proper extent at the proper time and, if the operation of the apparatus as a whole comes to a halt, to promptly cool the fabric.

It is an object of the present invention to provide an oven for hot-stretching such a fabric, particularly an oven having a moveable curtain between the fabric and the heating elements, in which these operations can be carried out to advantage while subjecting them to a high degree of control. In its preferred form, the invention contemplates an oven of the tower type having a heating leg provided with interceptive means for cutting into operation and cutting out of operation a series of ducts that are adapted to direct quenching air toward the fabric from one side of the oven to the other, such interceptive means taking the form of sliding dampers adapted to cover and uncover the ducts for supplying and withdrawing the air. It further contemplates a compact system of fan boxes for supplying and withdrawing quenching air in the manner just described. With the aid of suitable controls, it thus becomes possible to terminate the heating step and initiate the quenching step in a sharply defined zone that at a given time may be located anywhere between the two ends of the heating leg, depending on the needs of the situation.

Other objects, advantages and features of the invention will be apparent from the description which follows and from the accompanying drawings, in which.

Figure 1:
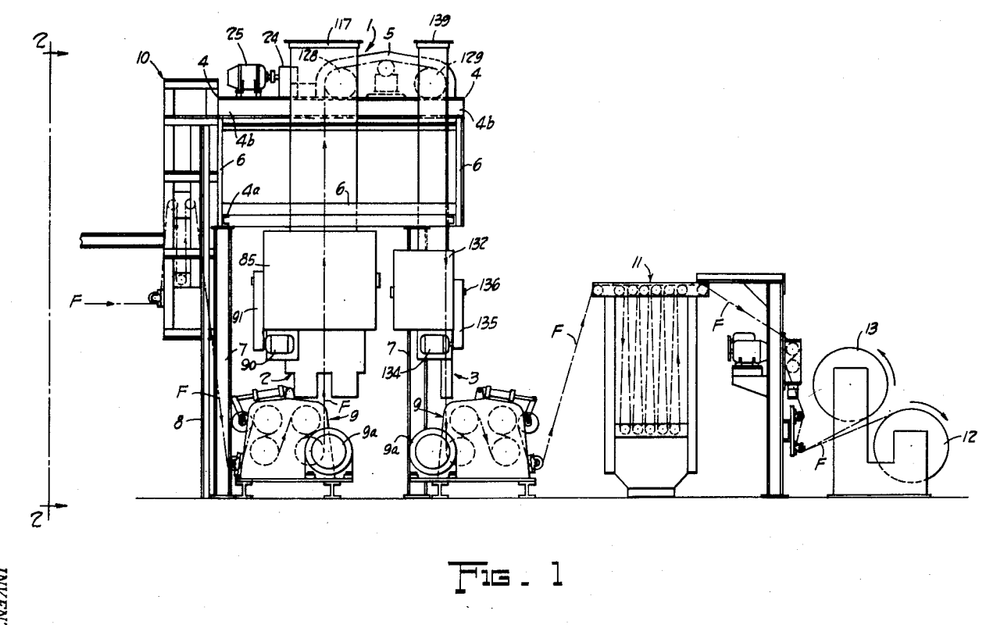
Figure 1 is a simplified side elevation of an installation for hot-stretching textile fabrics, said installation including a tower-type oven of a kind to which the invention relates.

In the drawings, particularly Figure 1, the oven generally is designated 1. It comprises a heating leg 2 which the fabric enters at its lower end, such heating leg appearing at the left in Figure 1, and a laterally spaced cooling leg 3 which the fabric leaves at its lower end. It will be apparent from what is brought out at greater length below that some cooling is accomplished in heating leg 2, at least in ordinary circumstances; however, the oven as a whole may, if desired, be so operated that heating leg 2 is used exclusively for heating purposes. Whereas heating leg 2 may to this extent have both a heating function and a cooling function, the latter particularly in the upper portion of the heating leg, cooling leg 3 has no heating function.

Figure 2:
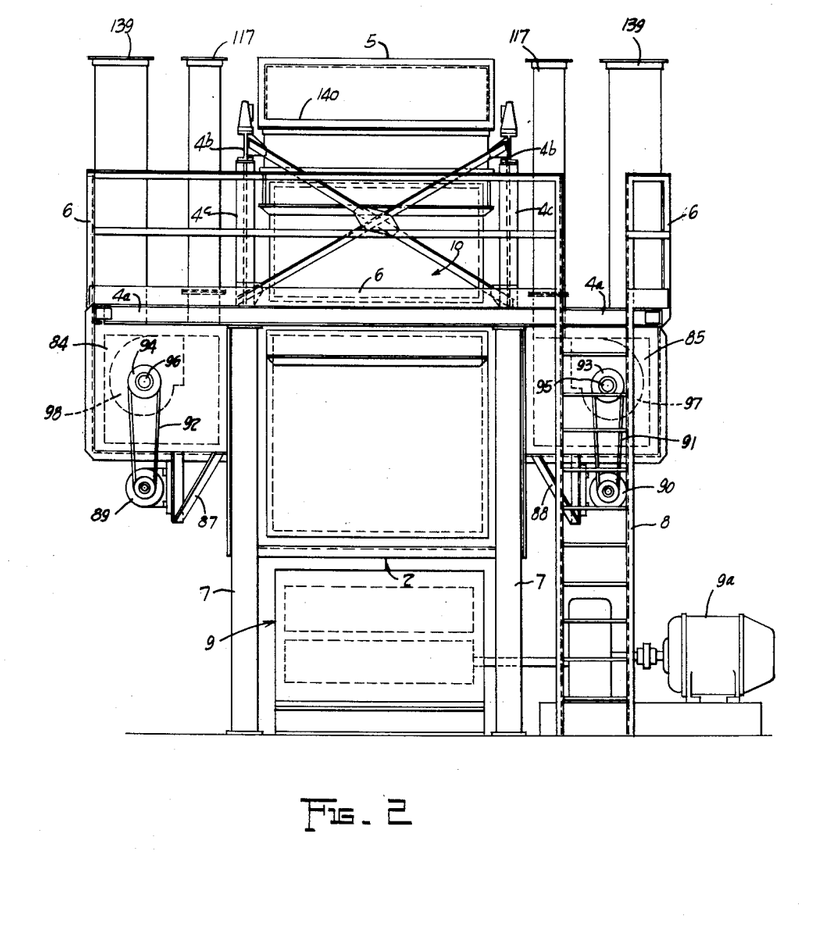
Figure 2 is an end elevation of the oven seen as if from line 2—2 of Figure 1.
Figure 4:
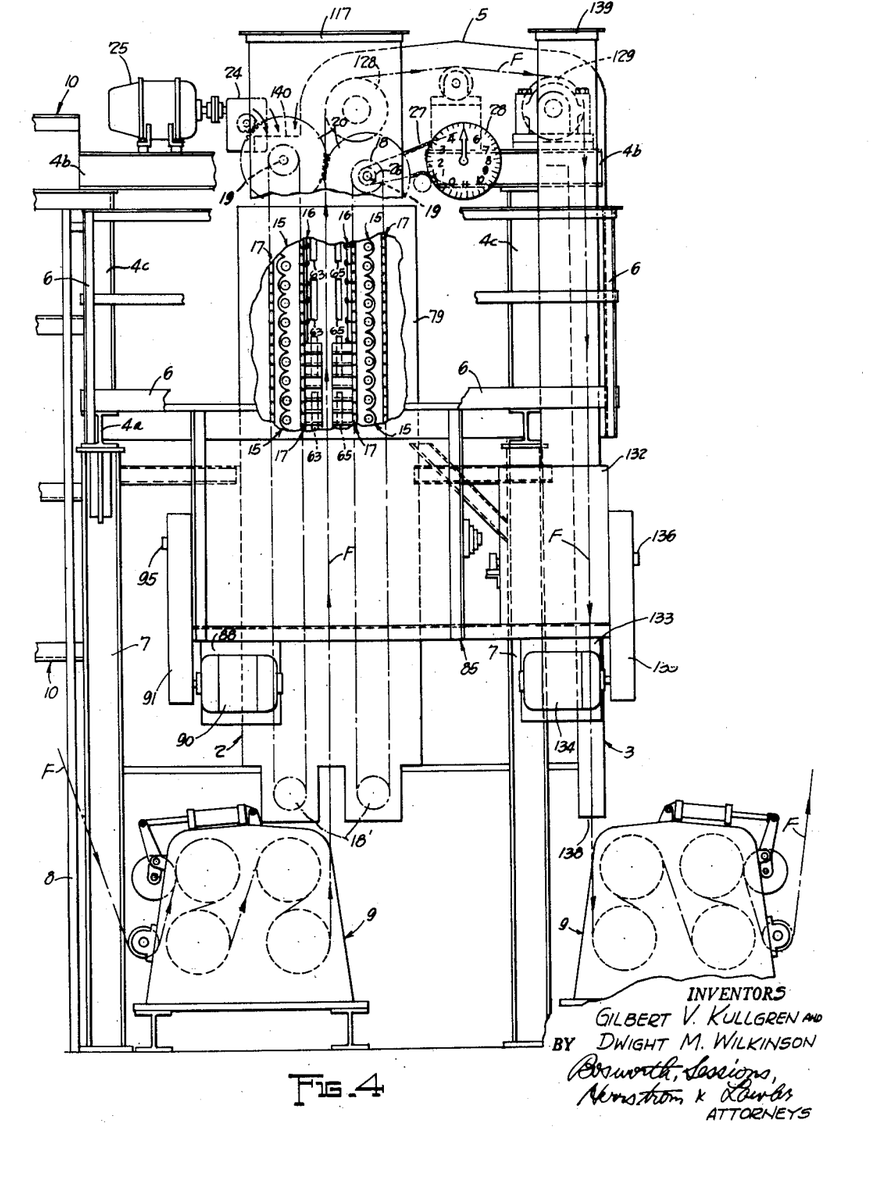
Figure 4 is a side elevation of the oven seen as if from line 4—4 of Figure 3.

Interconnecting heating leg 2 and cooling leg 3 at their upper ends is a superstructure 4, the latter incorporating as a part thereof a top structure 5 taking the form of a sheet metal housing. Superstructure 4 is made up of a plurality of horizontally extending structural elements 4a and 4b and a plurality of vertically extending structural elements 4c (Figure 2). It is surrounded by a railed platform 6. Four vertically extending structural elements 7 support superstructure 4. The latter in turn supports heating leg 2 and cooling leg 3, which are suspended from it. They terminate as shown in Figures 1 and 4 some distance above the floor level. For the convenience of the operator, a ladder 8 provides access to platform 6.

In juxtaposition to the lower ends of heating leg 2 and cooling leg 3 are two like roll stands 9 and two like electric motors 9a. Roll stands 9 are of the same general construction as those shown and described in said prior application, being used to tension and stretch the fabric as it travels upward through heating leg 2, across from one leg to the other in top structure 4, and downward in cooling leg 3. As seen in Figure 1, fabric F enters from the left, proceeding first to a dancer roll assembly 10 of conventional construction. After following the above-described path through oven 1, it proceeds to a conventional accumulator 11 and thence through conventional tensioning apparatus to one of the two take-up rolls 12 and 13.

Figure 5:
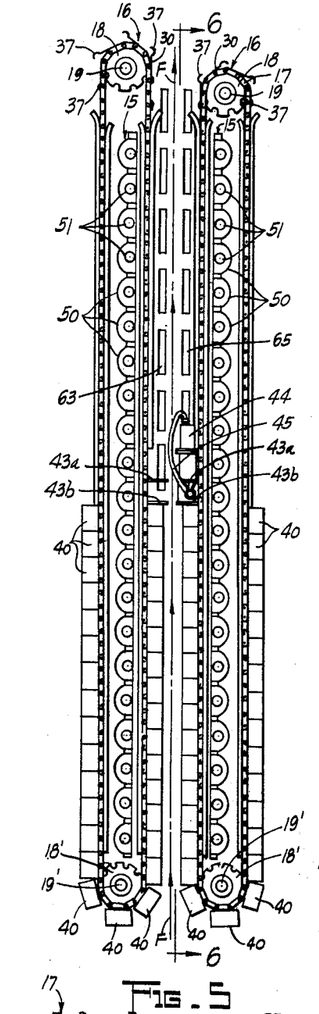
Figures 5 and 6 show the heating units and curtains for covering and uncovering them, Figure 5 showing them as seen from their ends and Figure 6 showing them as seen from the plane of the fabric.

As indicated in Figures 4 and 5, heating leg 2 incorporates two oppositely directed fabric-heating banks 15, 15 each of which consists of a series of stacked heating units of the radiant type. Banks 15, 15 extend vertically, face toward each other, and are spaced sufficiently from each other to permit the fabric to travel upward between them. Each of the heating units of each bank consists of an elongated reflector, a quartz tube heating element, and appropriate electrical connectors and leads. By control means similar to those described in said prior application, the heating units making up banks 15, 15 may be cut into and out of operation in progressive fashion. The voltage on the individual heating elements may be increased or decreased automatically as necessary to develop the optimum temperature, which may be as high as 1400° to 1600° when the heating units are being actively used to heat the fabric. The two banks of heating units are supported within heating leg 2 by a plurality of vertically extending structural elements (not shown).

In the space between banks 15, 15 there is on each side of fabric F an articulated slat curtain similar to that shown and described in the prior application, such curtains opening from and closing toward the bottom of the installation. Curtains 16, 16 are supported from their lateral edges by endless chains, there being two chains 17, 17 for each of the two curtains. Seen as in Figures 4 and 5, the chains at the near end of the installation appear to encompass the two banks of heating units; however, each of the four chains depends from and is driven by an upper power-driven sprocket 18 mounted on a horizontally extending shaft 19 (Figure 5) of a length greater than the width of fabric F. The two shafts are offset slightly in a vertical direction, as are the two pairs of sprockets mounted on them. Thus at the top of heating leg 2 there are four power-driven sprockets 18 on two shafts 19. At the lower end of heating leg 2, four similar sprockets 18' are mounted on two shafts 19'. Lower sprockets 18' and lower shafts 19' are not power-driven but are rotated by chains 17, 17.

Figure 8:
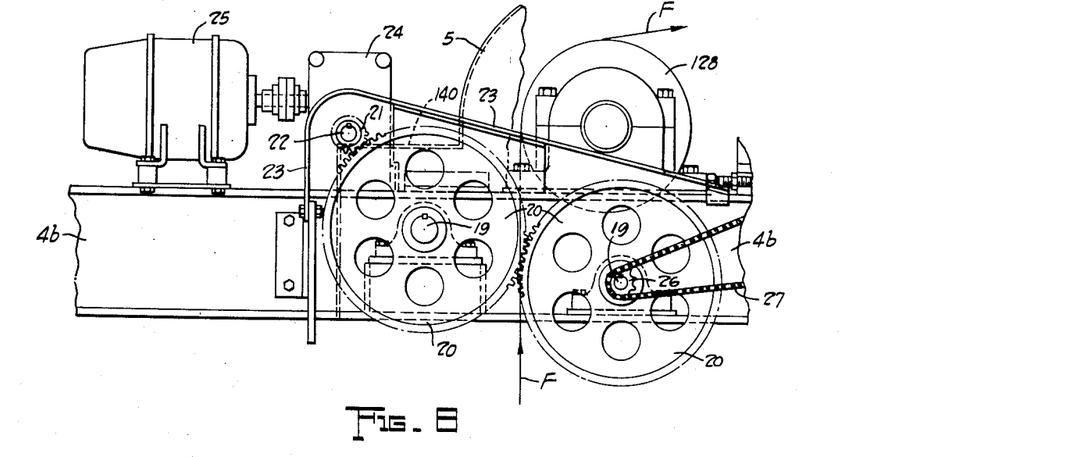
Figure 8 shows the power train which drives the sprockets at the top of the tower, the sprockets themselves being concealed by the power train.

Reference to Figures 4 and 8 will show how upper shafts 19 are driven. At their outer ends; i. e., the ends on the near side of the oven as seen in Figure 4, shafts 19 are provided with inter-meshing gears 20, one on each shaft. The gear at the left as seen in Figures 4 and 8 is driven by a pinion 21 on a shaft 22 which projects outwardly beneath guard 23 (Figure 8) from a speed reducing unit 24. The latter is driven from an electric motor 25 disposed at the top of the oven immediately above one of the structural elements 4b. A system of appropriate controls, such as are described in co-pending application Serial No. 449,964, determines when, at what speeds, and for what periods of time motor 25 is to operate. Its operation is reflected in periodic rotation of gears 20 which, through horizontal shafts 19, rotate sprockets 18. As indicated in Figure 8, one of the two shafts 19 is provided with an end sprocket 26 and a chain 27 by which movement of the shafts and gears forming part of the drive systems may be communicated to a dial 28 mounted on the superstructure (Figure 4).

Each of the two curtains 16, 16 is articulated in the sense that it is made up of separate slats 30, the number of slats in each curtain being such that in its closed position the curtain is substantially co-extensive with the distance intervening between the bottom of lower sprocket 18' and the top of upper sprocket 18. Depending upon the positions of curtains 16, 16, slats 30 may or may not close off the heating units in banks 15, 15. In the situation represented in Figures 5 and 6, slats 30 extend upward from a point approximately halfway up each of banks 15, 15 to and over upper sprockets 18 and thence down on the opposite side to a point halfway between upper sprockets 18 and lower sprockets 18'.

Figure 7:
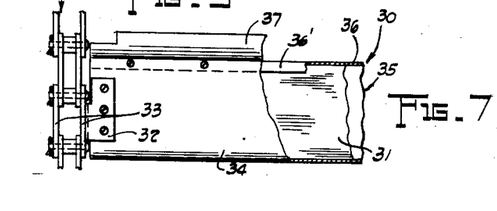
Figure 7 is a fragmentary elevation of one of the slats used to make up the curtains.

Each of slats 30 consists, among other components, of a board-like element 31 of heat insulating material held at each end by a bracket 32 to one of the links 33 forming part of one of chains 17: see Figure 7. The front face 34 of each of slats 30 is covered by a U-shaped sheet of highly polished aluminum that extends down on the frontside, across on the bottom, and up on the opposite side, forming thereby the rear face 35 of the same slat. It continues forwardly as seen in Figure 7 across the top, indicated at 36, where a depending lip 36' abuts the rear of front face 34. Thus the aluminum sheet forms an enclosing pocket for the insulating material. Along its upper edge, above lip 36', slat 30 is provided with a convex overlap flap 37, likewise of aluminum, which is provided to seal the opening between the slat to which it is attached and the one adjoining it.

Inasmuch as slats 30 are rigidly attached to links 32 of chains 17, overlap flaps 37 extend tangentially to sprockets 18 at the top of the installation: see Figure 5. Sealing strips 39 of asbestos or a high-melting plastic composition intervene as shown in Figure 6 between the heating units and slats 30.

Below slats 30 (seen as in Figure 5 and 6) chains 17 are provided with outwardly projecting sliding dampers 40 which, like slats 30, are articlulated in the sense that they tend to separate as they pass around the sprockets: see the lower portion of Figure 5. Dampers 40 take the form of generally rectangular fin-like elements of aluminum mounted directly on chains 17; however, instead of stretching across curtains 16, 16 from one side to the other, as do slats 30, dampers 40 project at right angles to the general plane of the curtain. In Figure 5, in which the installation is seen from the end, dampers 40 are shown as seen in side elevation. In Figure 6, they are shown as seen in end elevation; i. e., from their outside edges. Dampers 40 are attached to the links of chains 17 below slats 30. As seen in Figures 5 and 6, dampers 40 continue down from a zone approximately mid-way of the installation to the bottom of the installation, around pulleys 18', and up on the other side to a zone approximately mid-way between sprackets 18' and sprockets 18.

Figure 6:
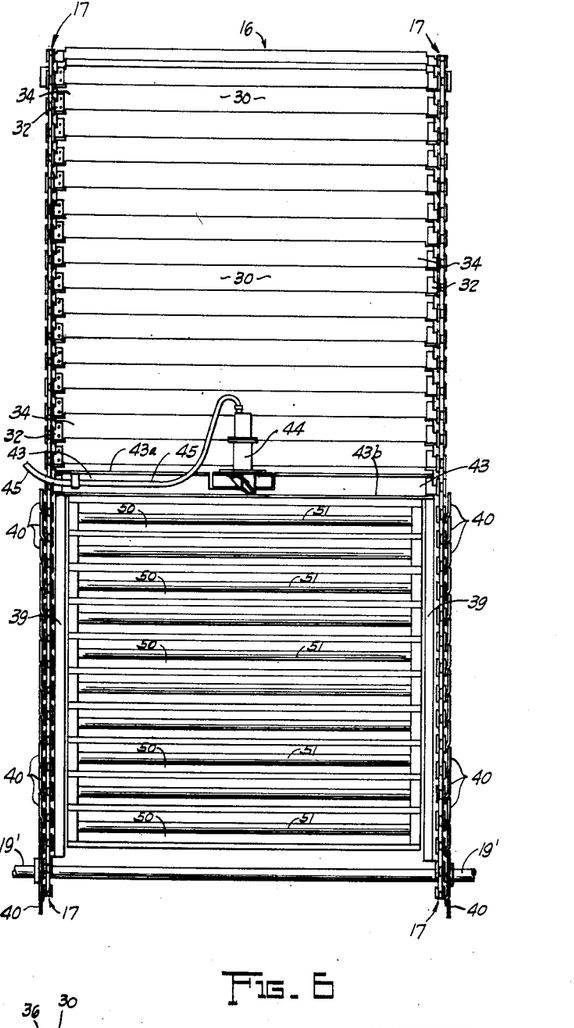

At any given time, the position of dampers 40 is of course determined by curtains 16, 16. If the latter are completely closed; i. e., if they extend all the way from the top to the bottom of the installation, dampers 40 will of course be on the opposite side, where they are out of the way. With curtains 16, 16 in intermediate positions, one of which is illustrated in Figures 5 and 6, the heating units in banks 15, 15 are not entirely covered by slats 30 but are exposed, as can be seen from the lower half of Figure 6. Over this same area, dampers 40 are in position to act as end baffles to interfere with the flow of cooling air proceeding from one side of the installation to the other as hereinafter more fully explained.

Where the lowermost slat 43 appears in Figure 6; i. e., just above sliding dampers 40, that one of the two curtains which appears in Figure 6 is equipped with a mirror, focusing lens and a thermopile of the kind known as a Low Range Radiamatic Unit. Such unit, which moves up and down with curtain 16, forms part of a limit or overriding control in that it measures the temperature of the fabric as it leaves the heating zone and actuates controls to reduce the length of the heating zone or the temperature of heating elements to prevent the temperature of the fabric from exceeding a predetermined limit. Designated 44, this unit is connected to the control system by leads in cable 45. There are two slats 43, one on each curtain. Each of these slats is channel-shaped as seen in transverse cross section: see Figure 5. The top and bottom portions thereof, designated 43a and 43b, serve as baffles tending to keep warm air from working up into the space above and cool air from working down into the space below slats 43, thus providing a sharp demarcation between the heating zone below slats 43 and the cooling zone above them.

Figure 9:
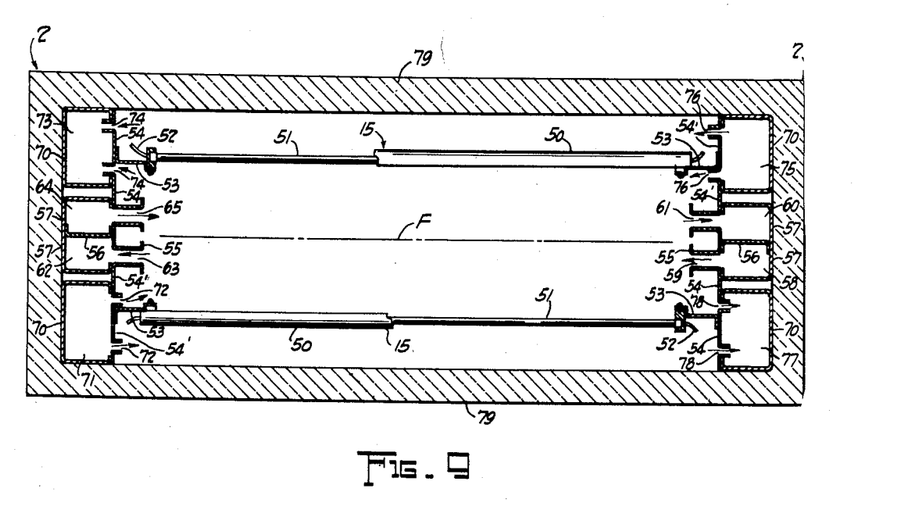
Figure 9 is a horizontal section through the portion of the tower used for heating and quenching the fabric, the chains and the curtains carried by them being omitted.

Referring to Figures 5 and 9, particularly the former, it will be apparent that in each bank 15 the several heating units are so related to each other that all of the reflectors 50 direct the heat generated by the corresponding heating elements 51 onto the same side of the fabric. As indicated in Figure 9, leads 52 supply electrical current to heating elements 51, which are mounted at their ends on brackets 53. Brackets 53 are themselves mounted on longitudinally ported vertically extending sheet metal elements 54 and 54', one for each bracket, that form part of a vertically disposed system of duct work flanking the common ends of the two banks 15, 15.

Sheet-metal elements 54 and 54' are ported to provide for the ingress and egress of air as indicated, for example, by the arrows at the left in Figure 9. Between sheet-metal elements 54 and 54' at that end of the installation is a centrally located channel-shaped sheet-metal strip 55 mounted on a sheet-metal supporting piece 56 which extends continuously from top to bottom inside the duct work. On the right in Figure 9, like sheet-metal ele­means 54 and 54' provide ports for the ingress and egress of air, again as indicated by arrows. Disposed between them is a channel-shaped sheet-metal strip 55 mounted on a sheet-metal supporting piece 56 which, as before, extends vertically within and forms part of the duct work.

Referring still to the right-hand side of Figure 9, it will be noted that supporting strip 56 approximately bisects a large duct 57 of generally channel-shaped conformation. It divides duct 57 into two substantially identical cham­bers. One of them, designated 58, constitutes a source of cool air under super-atmospheric pressure. Such air is forced out of chamber 58 in a direction generally paral­leling the plane of fabric F, passing through a vertically extending outlet port 59. The companion chamber on the opposite side of supporting strip 56, designated 60, re­ceives cool air that is drawn in under subatmospheric pressure through a vertically extending inlet port 61, such air travelling across fabric F from a source at the opposite end of the installation. Thus fabric F is blanketed on its two sides by cool air travelling from right to left on one side of fabric F and from left to right on the other.

At the left-hand end of Figure 9, a supporting strip 56 likewise divides a channel-shaped duct 57 into two sub­stantially identical chambers. One of them, designated 62, makes use of sub-atmospheric pressure to draw in cool air through a vertically extending inlet port 63. The latter is directly opposite outlet port 59 for chamber 58. The companion chamber, designated 64, supplies cool air under super-atmospheric pressure through a ver­tically extending outlet port 65 located directly opposite inlet port 61. Thus air passing from chamber 64 through outlet port 65 is drawn into inlet port 61 and chamber 60. The air so used to blanket fabric F is at room temperature or at most a temperature only slightly in excess of room temperature, being supplied by the cool air circulation system hereinafter described.

In the four corners of heating leg 2, seen in cross section as in Figure 9, are four large ducts 70 each of which is provided with two longitudinally extending ports for receiving or discharging air heated to a temperature in the range between about 300° and about 450° F.: in a typical case, 400° F. In one of the two ducts 70 at the left in Figure 9, chamber 71 discharges such air at super-atmospheric pressures through two outlet ports 72, of which there is one on each of the two opposite sides of the bank of heating units represented by the adjoining reflector 50 and heating element 51. At the same end of the installation, the other duct 70 has a chamber 73 into which heated air is drawn under sub-atmospheric pressure through two inlet ports 74. It will be noted that these ports are disposed on opposite sides of the bank of heat­ing units represented by the adjoining reflector 50 and heating unit 51.

In each case, one result is to blanket the reflectors and heating units with air, thus preventing excessive tem­peratures from developing in them. In the zone below bottom slat 43, where the flow of cooling air is interrupted by sliding dampers 40, the heated air passing through the outlet ports 72 and inlet ports 74 located next to the pass line of the fabric acts also on the fabric itself. In doing so, it provides an ambient temperature close to the maxi­mum temperature reached by the fabric under optimum heating conditions. Thus if the fabric tends to become over-heated, it tends to absorb excess heat from the fabric.

At the right hand end of the installation, seen in cross section as in Figure 9, a chamber 75 in an oppositely lo­cated duct 70 serves as a source of heated air, which it supplies through two outlet ports 76. This air, like that in chamber 71, is at super-atmospheric pressures. It is distributed by outlet ducts 76 on both sides of the ad­joining bank of reflectors and heating units. It is this current of air, travelling from right to left as seen in Figure 9, that is received in inlet ports 74 and chamber 73 at the left-hand end of the installation. Similarly, a chamber 77, likewise formed in one of the ducts 70, re­ceives heated air through inlet ports 78, such air being drawn under sub-atmospheric pressures into chamber 77. This air emanates from outlet ports 72 in chamber 71 at the left-hand end of heating leg 2 as seen in Figure 9.

As indicated in Figure 9, the duct work, reflectors and heating elements (together with the curtains, chains, dampers and other parts not shown therein) are enclosed by panels 79 of heat-insulating material, such panels comprising the walls of heating leg 2.

As will appear below, the above-described system for blanketing banks 15, 15 and fabric F with heated air is part of a warm air re-circulation system. The ultimate source of heat is the battery of heating elements 51 in banks 15, 15, which heat the fabric primarily by radiation. Naturally, air that is repeatedly passed over the reflectors and heating elements in banks 15, 15 tends to pick up heat supplied by the heating elements. The constant re-circulation of this air tends to minimize the effect of con­vective heat losses in the installation; in addition, the combination of heat supplied by re-circulated air with heat supplied primarily by radiation has advantages of its own. One of these is the fact that it increases the heat transfer rate to the fabric in the initial stage of heating and minimizes the possibility of exceeding the final de­sired temperature in the final stage of heating. At the bottom of heating leg 2, where the radiant heating ele­ments have not yet had an opportunity to act on the fabric, the heated air acts to pre-heat the fabric, which it does to especial advantage by virtue of the substantial tempera­ture difference between the air and the fabric.

Figure 10:
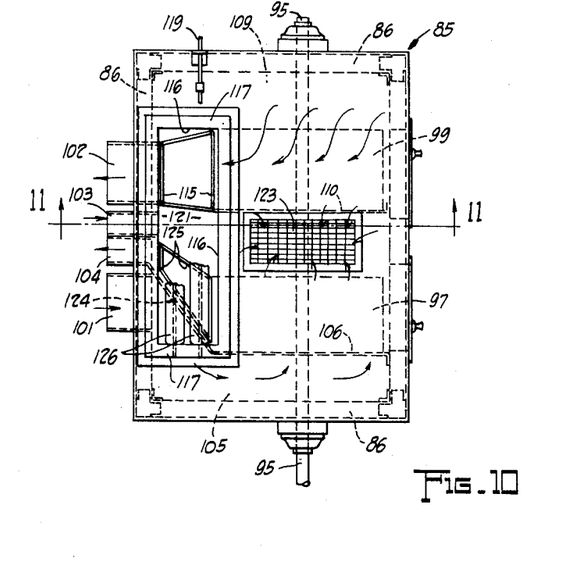
Figure 10 is a top plan of one of the fan boxes.

Adjacent heating leg 2 are two fan like boxes 84 and 85, best seen in Figure 2. By means about to be de­scribed, these fan boxes accomplish the circulation re­quired to develop the above-described flow of cool air over fabric F and of heated air over fabric F and banks 15, 15. The details of construction of the fan boxes are shown in Figures 10 to 13, of which Figure 10 shows fan box 85 as seen in plan. Ducts connecting fan boxes 84 and 85 to chambers 58, 60, 75 and 77 do not appear in the drawings, but is will be understood that conventional duct work is used for conveying the air from heating leg 2 to fan boxes 84 and 85 and from fan boxes 84 and 85 to heating leg 2. Respectively, fan boxes 84 and 85 are coupled to heating leg 2 to the left and right of the sec­tion shown in Figure 9.

Fan box 84, seen only in Figure 2, is generally similar to fan box 85. In order that the cool air and the heated air may be circulated as heretofore described, it is re­versed laterally, end for end, in relation to fan box 85. Thus it cannot be described as a mirror image of fan box 85. Instead, it is a duplicate of it, reversed as stated, except insofar as it has appeared necessary to modify the drive system for the fans with a view to making the motors and other parts of the drive system accessible from the entry end of the oven; i. e., the end seen in Figure 2. In view of these similarities, fan box 84 will not be described further beyond observing that it, like fan box 85, is enclosed within top, bottom and side walls 86 of heat insulating material.

It should be noted, however, that the fans in fan boxes 84 and 85 are driven from motors supported below the respective fan boxes in the manner indicated in Figure 2. Thus supporting elements 87 and 88 are employed to mount motors 89 and 90, respectively. Belt 91 rotates shaft 95 through pulley 93; belt 92 rotates shaft 96 through pulley 94. The fans operated by the shafts are indicated in dotted lines at 97 and 98, the former being driven by shaft 95 and the latter by shaft 96.

Actually there are two fans in each fan box, one for warm air circulation and another for cool air circulation. Back of fan 97 as represented in dotted lines in Figure 2 is a second fan 99, the latter being indicated in Figure 10. Both fans are mounted on the same shaft 95, which projects through the heat-insulating material 86 on the side walls of fan box 85. As will appear below, fan 97 is used exclusively by the cool air circulating system and fan 99 exclusively by the warm air circulating system.

Recalling that fan box 85 as seen in plan in Figure 10 adjoins the right-hand side of heating leg 2 as seen in section in Figure 9, it will be apparent that there should be two large ports 101 and 102 for warm air and two other ports, which may be smaller, for cool air, the latter being designated 103 and 104 in Figure 10. Port 101 is connected by a suitable duct to chamber 77 (Figure 9); similarly, port 102 is connected by a duct to chamber 75. In like manner, port 103 is connected to chamber 60 and port 104 is connected to chamber 58. In a sense, as will appear below, the warm air circulation system may be said to envelop or encompass the cool air circulation system, this for the reason that warm air from heating leg 2 enters one end of fan box 85 through port 101, passes thence through the entire length of the fan box, and leaves the fan box at the other end thereof through port 102.

To make this possible, partitions in fan box 85 form three distinct chambers in the warm air circulation system. The first chamber to be encountered is end chamber 105, best seen in Figures 10, 12 and 13, which is formed by a vertical partition 106 that prevents entry into fan 97 of warm air from chamber 77 (Figure 9). It serves to deflect incoming warm air below the level of fan 97. A horizontal partition 107 which appears in Figures 11 and 13 assists in the accomplishment of these ends; as a result of its presence, a horizontally extending chamber 108 is formed below fans 97 and 99 into which the warm air proceeds from end chamber 105: see Figure 13.

Figure 12:
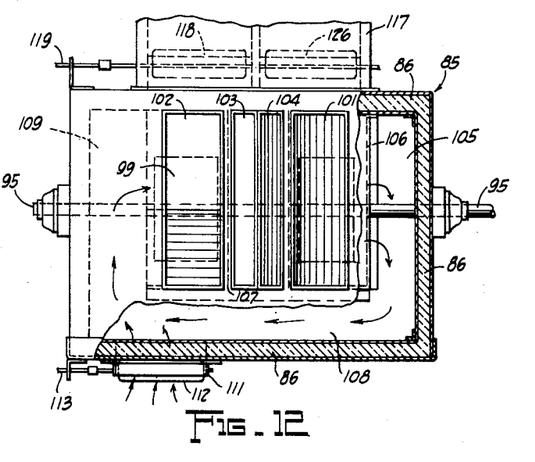
Figures 12 and 13 are elevations of the fan box as seen from lines 12—12 and 13—13 of Figure 11, parts of each being broken away to show interior details.

Leaving horizontally extending bottom chamber 108, the incoming warm air then moves into end chamber 109 (Figures 10, 12 and 13) which in general is similar to end chamber 105 but located at the opposite end of fan box 85. There is, however, no partition separating end chamber 109 from fan 99; consequently, warm air entering end chamber 109 can enter fan 99 and be discharged under super-atmospheric pressure through large duct 102 (Figures 10 and 12). A vertical partition 110 (Figures 10 and 13) serves to seal off the space between fans 97 and 99, thus facilitating the above-described movement of the warm air.

If no provision were made for drawing in room air at ordinary room temperatures, this warm air circulation system, which, as already stated, is essentially a re-circulation system, would tend to drive up unduly the temperature within heating leg 2. It is desirable, therefore, that an air intake 111 for room air be provided at the bottom of fan box 85 in approximately the position indicated in Figures 11, 12 and 13. Such air intake is controlled by a damper 112 operated by a rod 113 that may be either manually or automatically actuated so as to bleed in the proper amount of room air at the prevailing room temperature. The room air so drawn into the warm air circulation system blends with the warm air being re-circulated, moderates its temperature, and tends to keep the temperature in the vicinity of the fabric from exceeding the desired level of about 400° F. The discharge of this temperature-moderated warm air from fan 99 into large port 102 is controlled by the constant velocity dampers 114 indicated in dotted lines in Figure 11.

Figure 11:
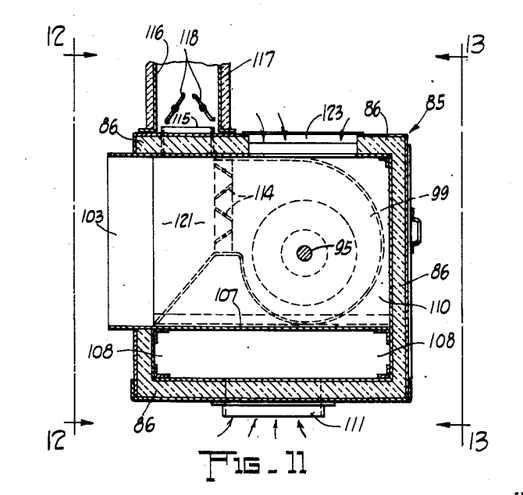
Figure 11 is a vertical section through the fan box on line 11—11 of Figure 10.

In order that the warm air re-circulated by fan 99 may, if desired, be discharged to the atmosphere, there is a short vent opening 115 in the duct which leads from fan 99 to large port 102. This vent opening, which, as seen in plan, is trapezoidal in shape, is shown in Figures 10 and 11. It communicates with an overlying duct 116 of oblong shape that extends upward within a stack 117: see Figure 11. Within duct 116, immediately above the vent opening 115, are two dampers 118 the position of which can be changed through operating rod 119, which is coupled to the temperature control system for automatic actuation of dampers 118. Under ordinary circumstances these dampers are partly or entirely closed; however, if it becomes desirable to vent to the atmospheer any large part of the mass of warm air that is being re-circulated, dampers 118 open to permit it to escape, thus preventing over-heating in the system.

Figure 13:
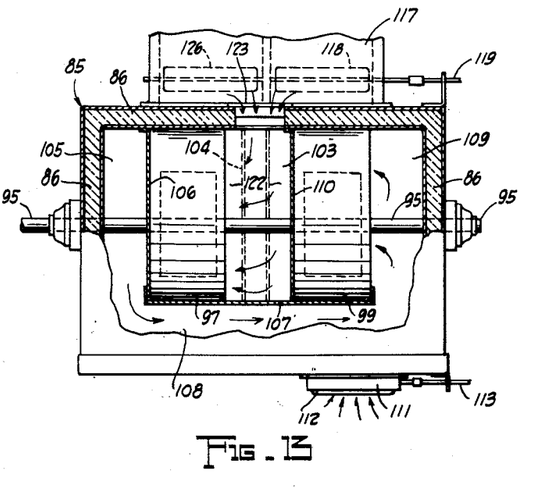

Back of cool air ports 103 and 104, particularly the former, is a chamber 121 which, seen as in Figure 10, is generally trapezoidal in shape. It is in open communication with a second chamber 122, best seen in Figure 13, which intervenes between fans 97 and 99. There is no partition separating fan 97 and chamber 122; accordingly, cool air from chamber 60 entering fan box 85 through duct 103 travels first into trapezoidal chamber 121, then into chamber 122, and then into fan 97. Additional air at room temperature may be drawn in through an air intake 123 overlying chamber 122 as shown in Figures 10, 11 and 13.

Cool air entering fan box 85 from port 103, together with air at room temperature that is drawn in through air intake 123, is discharged by fan 97 into a trapezoidal duct 124, best seen in Figure 10. It travels through duct 124 into port 104 and thence into chamber 58 (Figure 9). Constant velocity dampers (not shown) similar to dampers 114 control the flow of air chamber 58. Overlying trapezoidal duct 124 is a correspondingly shaped vent opening 125, seen in Figure 10, which discharges within the limits of duct 116 in stack 117. Immediately above vent opening 125 is a pair of dampers 126, shown in Figures 10, 12 and 13. Unlike dampers 118, these dampers need not be controlled automatically but may be controlled manually, if desired.

In this way, cool air is discharged into heating leg 2 from fan box 85, after which it proceeds transversely across heating leg 2 from one side to the other in a path paralleling the plane of fabric F. It is drawn into fan box 84, from which it is returned to heating leg 2. At the same time, warm air entering fan box 85 through port 101 is returned to heating leg 2 through port 102. On the opposite side of heating leg 2, warm air that has passed over the reflectors and heating units is drawn into fan box 84, wherein it is re-circulated and returned to heating leg 2.

In the normal operation of the oven, this flow of warm air between fan boxes 84 and 85 takes place uninterruptedly, the warm air passing repeatedly from chamber 71 to chamber 77 and from chamber 75 to chamber 73 (Figure 9) over the two banks of reflectors and heating elements. The position of curtains 16, 16, whether fully open, partially open or closed, makes no difference to this circulation of warm air from one side of the apparatus to the other. If curtains 16, 16 are in open or a partially open position, the movement of warm air across those reflectors and heating elements that are disposed below bottom slats 43 assists in keeping the heating units operating at maximum efficiency. It also helps to heat the fabric as already explained. Above bottom slats 43, where, in accordance with the co-pending application, one or more of the heating units may be operating on a ready basis in anticipation of imminent upward movement of curtains 16, 16, the travel of warm air from one side of the installation to the other tends to prevent overheating. It works no harm when all of the heating elements are on a stand-by basis, as when curtains 16, 16 are closed.

By contrast, it is important that the flow of cool air between fan boxes 84 and 85 should take place immediately above, and only above, the level of bottom slats 43. This is true without regard to whether bottom slats 43 are in a middle position such as that represented in Figures 5 and 6 or in an extreme position near the top or bottom of the installation. However, if bottom slats 43 are rather close to but nevertheless somewhat above the bottom of the installation, as when the fabric is moving particularly slowly, it is desirable that the fabric be cooled very promptly, as by air moving from one side of the apparatus to the other through ports 59, 61, 63 and 65 (Figure 9). Therefore, above the level of bottom slats 43, whatever that level may happen to be, all of these ports may advantageously be open. On the other hand, below the level of bottom slats 43 there is not only no advantage but a real disadvantage to permitting cooling air to travel from one side to the other of heating leg 2.

It is for these reasons that sliding dampers 40 are provided as already explained. They are carried by chains 17 in positions in which they can intercept the flow of cool air through ports 59, 61, 63 and 65. With reference to Figures 5 and 6, it will be noted from the former that below the level of bottom slats 43 dampers 40 cut off the travel of cool air by way of ports 63 and 65 and, of course, by way of corresponding ports on the opposite side of the heating leg. In consequence, little or no cooling air escapes from these ports into the area in which the fabric is being subjected to the action of the heat developed by the heating units. Bottom slats 43, which separate the heating zone from the cooling zone, keep cool air from moving downward from the latter into the former.

As has already been mentioned, fabric F travels upward in heating leg 2 and downward in cooling leg 3. In proceeding from one to the other, it passes through the sheet metal housing 5 on superstructure 4. In or on the latter are idler rolls 128 and 129, together with accessory equipment such as dial 28 and means indicating the tension on the fabric. In this area, which forms part of the cooling system, the fabric is exposed to the action of air at room temperatures that is drawn into housing 5 by fans associated as below explained with cooling leg 3.

Figure 3:
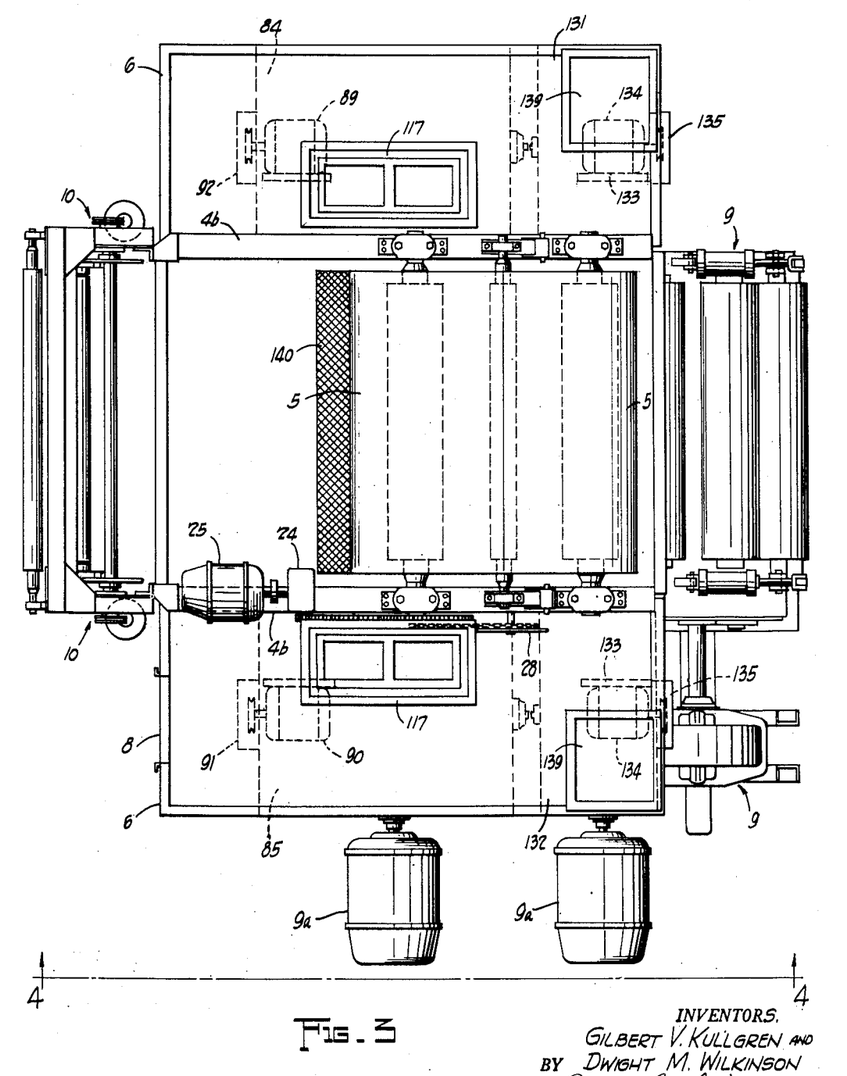
Figure 3 is a top plan of the oven.

Referring first to Figure 3, cooling leg 3 is provided on the two sides thereof with fan boxes 131 and 132 which are similar to but simpler than fan boxes 84 and 85. In each of fan boxes 131 and 132 is a fan (not shown) driven by an electric motor disposed below the fan box. As indicated in Figure 4, a supporting structure 133 mounts an electric motor 134 connected through a belt 135 to a shaft 136 on which is mounted the fan contained in fan box 132. This fan draws into the system air at or slightly above room temperatures. It is air so drawn into the system that completes the task of returning fabric F to temperatures approaching ordinary room temperatures.

The bottom end of cooling leg 3 is of course open to the atmosphere at 138: here fabric F leaves the cooling leg. Because of the presence of the fans in fan boxes 131 and 132, cool air is drawn into cooling leg 3 through opening 138. Such air travels upward and as it does so it blankets fabric F, which is moving downward toward opening 138. It discharges through one or the other of two spaced stacks 139: see Figure 3. One stack is disposed above the fan in fan box 131; the other, above the fan in fan box 132. The intake or suction sides of the fans in fan boxes 131 and 132 communicate with cooling leg 3; the exhaust or discharge sides, with the stacks 139.

However, if fabric F is to be cooled as it passes through sheet metal housing 5, an air-intake grill 140 has to be provided at or near the forward end of sheet metal housing 5, preferably where shown in Figures 3, 4 and 8. Room air is drawn into the system at this point, this in consequence of the previously mentioned fact that the fans in fan boxes 131 and 132 are so arranged that the suction sides thereof are in communication with cooling leg 3. Air taken into the system through air intake 140 is drawn through the horizontally travelling portion of fabric F, pulled into the two fans, and discharged through stacks 139.

Considered in its entirety, the oven has a variety of novel features, including, inter alia, the provision of means for circulating warm air from one side of the heating leg to the other over the reflectors and heating elements and to some extent over the fabric itself. Within the heating leg, the provision of means for circulating cool air over the fabric in that zone in which the fabric is not being subjected to the action of heat is another novel feature. Whereas the circulation of warm air over the heating unit may, if desired, be allowed to proceed uninterruptedly without regard to the position of the curtains, the means for circulating cool air over the fabric are preferably so organized that there is a cessation or virtual cessation of any flow of cool air into and in a sharply delineated zone in which the fabric is being heated.

The heating and cooling functions are controllable with exactness, being coordinated with movement of the curtains. In part this results from the provision of movable cut-off means taking the form of slideable dampers for interfering as described with the flow of cool air through that portion of the heating leg that is being used for heating coupled with other moveable means for minimizing or preventing the downward flow of cooling air out of and the upward flow of heated air into that portion of the heating leg that is being used for cooling, as by bottom slats 43. This makes for a simple, sturdy arrangement, one susceptible to a high degree of control, in which the length of the cooling leg exactly complements the length of the heating leg at any given time.

It is intended that the patent shall cover, by suitable expression in appended claims, all features of patentable novelty residing in the invention.

What is claimed is:

1. In an oven for heating and cooling a traveling web, a supporting structure; a battery of radiant heating units within said supporting structure, said radiant heating units being so arranged as to enable them to act on the web; moveable means of radiation-opaque material adapted to cover and uncover said radiant heating units; means adapted to blow cold air across the web; and, to prevent cold air from being blown across the web in that area in which said radiant heating units have been uncovered by said moveable means, interceptive means for interfering with the operation of the means adapted to blow cold air across the web.

2. An oven as in claim 1 in which said interceptive means are moved into and out of position by said moveable means.

3. An oven as in claim 2 in which said moveable means comprise an articulated curtain.

4. An oven as in claim 3 in which said curtain comprises a series of overlapping slat-like members each of which incorporates a body of heat-insulating material.

5. An oven as in claim 4 in which said slat-like members are mounted on endless chains.

6. An oven as in claim 5 in which parts of two parallel chains support the slat-like members and other parts thereof support the interceptive means.

7. An oven as in claim 6 in which the interceptive means include a transverse baffle extending between the two chains.

8. An oven as in claim 7 in which a pyrometric unit coupled to the heating units is mounted on the transversely extending baffle for movement with the curtain.

9. In an industrial oven, a supporting structure; two banks of radiant heating elements in said supporting structure; conveyor means encompassing said banks; radiation-opaque means carried by said conveyor means over part but less than all of the area thereof; cooling means associated with said banks; and, for interfering with the operation of said cooling means, interceptive means carried by parts of said conveyor means adjoining the parts carrying the radiation-opaque means.

10. An oven as in claim 9 in which said interceptive means take the form of sliding dampers.

11. An oven as in claim 10 in which said dampers comprise fin-like elements mounted directly on said conveyor means.

12. An oven as in claim 11 in which transversely extending baffles separate said radiation-opaque means and said fin-like elements.

13. In an oven for heating a travelling web, a supporting structure; a plurality of opposed heating elements in said supporting structure, said heating elements being of the radiant type; means for continuously conveying the web through the space between the heating elements; means adapted to supply quenching air to the space between the heating elements; radiation-opaque means for covering and uncovering the heating elements; and, associated with the means for covering and uncovering the heating elements, cut-off means controlling the supply of quenching air to the space between the heating elements.

14. In an oven for heating and cooling a travelling web, a plurality of opposed heating elements in said supporting structure; means for continuously conveying the web through the space between the heating elements; means for covering and uncovering the web; ducts for supplying and removing quenching air to the space between the heating elements, said ducts flanking the web along its opposite edges; and means forming openings on the ducts for directing quenching air across the web from one duct to another.

15. An oven as in claim 14 in which fans associated with the ducts impose super-atmospheric pressures on the air in one and sub-atmospheric pressures on the air in another of the ducts.

16. An oven as in claim 15 in which there is a plurality of ducts for air of super-atmospheric pressure and a plurality of ducts for air of sub-atmospheric pressure.

17. An oven as in claim 16 in which there is a pair of ducts at each edge of the web, each such pair of ducts comprising one duct for air of super-atmospheric pressure and one duct for air of sub-atmospheric pressure.

18. In an oven for heating and cooling a travelling web, a fan box comprising a shell; a motor driven shaft mounted in said shell; a first air circulation system within said shell, said air circulation system comprising a first fan driven from said shaft, a first air inlet leading from a point outside the fan box to said fan, and a first air outlet leading from said fan to a point outside the fan box; a second air circulation system within said shell, said air circulation system comprising a second fan driven from said shaft, a second air inlet leading from a point outside the fan box to said fan, and a second air outlet leading from said fan to a point outside the fan box; and means within said shell separating said air circulation systems from each other, said means taking the form of partitions so arranged within the shell that one of said air circulation systems is completely surrounded by the other.

19. An oven as in claim 18 in which one of said air circulation systems circulates only hot air and the other circulates only cool air.

20. An oven as in claim 19 in which the cool air circulation system is surrounded by the hot air circulation system.

21. In an oven for heating and cooling a travelling web, a supporting structure; a battery of radiant heating units within said supporting structure; movable means of radiation-opaque material adapted to cover and uncover said radiant heating units; means for blowing hot air across said radiant heating units; means for blowing cold air across the web; and, to prevent cold air from being blown across radiant heating units that have been uncovered by said movable means, interceptive means for interfering with the operation of the means for blowing cold air across the web.

22. In an oven for heating a traveling web, a supporting structure; two banks of radiant heating elements in said supporting structure; auxiliary heating means associated with said banks; conveyor means encompassing said banks; radiation-opaque means for shielding the web, said radiation-opaque means being carried by said conveyor means over part but less than all of the area thereof; and, carried by parts of said conveyor means adjoining the parts carrying the radiation-opaque means, baffle means interfering with the flow of heated air into the area in which the web is shielded by said radiation-opaque means.

23. In an oven for heating and cooling a travelling web, a supporting structure; radiant heating units within said supporting structure; curtain means of radiation-opaque material adapted to cover and uncover said radiant heating units; means for blowing cold air across the web, said means being co-extensive as to length with said curtain means; and, to prevent cold air from being blown across radiant heating units that have been uncovered by said curtain means, interceptive means for interfering with the operation of the means for blowing cold air across the web.

References Cited in the file of this patent

UNITED STATES PATENTS

| | | |
|---|---|---|
| 1,228,931 | Kirk | June 5, 1917 |
| 2,204,801 | Gessler | June 18, 1940 |
| 2,268,987 | Hess et al. | Jan. 6, 1942 |
| 2,297,314 | Offen | Sept. 29, 1942 |
| 2,321,907 | Gent | June 15, 1943 |
| 2,629,162 | Peck | Feb. 24, 1953 |
| 2,666,994 | Dungler | Jan. 26, 1954 |